(12) United States Patent
Burgazzoli et al.

(10) Patent No.: US 12,149,600 B2
(45) Date of Patent: Nov. 19, 2024

(54) DIFFERENTIATING CONTROLLERS AND RECONCILERS FOR SOFTWARE OPERATORS IN A DISTRIBUTED COMPUTING ENVIRONMENT

(71) Applicant: Red Hat, Inc., Raleigh, NC (US)

(72) Inventors: Luca Burgazzoli, Piacenza (IT); Paolo Antinori, Novara (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/551,532

(22) Filed: Dec. 15, 2021

(65) Prior Publication Data
US 2023/0188627 A1 Jun. 15, 2023

(51) Int. Cl.
*H04L 45/48* (2022.01)
*H04L 67/10* (2022.01)
*H04L 69/00* (2022.01)

(52) U.S. Cl.
CPC ............. *H04L 69/02* (2013.01); *H04L 45/48* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 11,429,465 B1* | 8/2022 | Baid | G06F 9/547 |
| 2020/0304297 A1* | 9/2020 | Radhakrishnan | H04L 9/3263 |
| 2021/0149732 A1 | 5/2021 | Barbara et al. | |
| 2022/0043699 A1* | 2/2022 | Bai | G06F 1/24 |
| 2022/0083364 A1* | 3/2022 | Jain | G06F 9/5027 |
| 2022/0156129 A1* | 5/2022 | Li | G06F 9/542 |
| 2022/0374284 A1* | 11/2022 | Kirmse | G06F 9/5077 |

FOREIGN PATENT DOCUMENTS

| | | |
|---|---|---|
| CN | 112579253 A | 3/2021 |
| CN | 112988266 A | 6/2021 |

OTHER PUBLICATIONS

"Example-Based Live Programming for Everyone Building Language-Agnostic Tools for Live Programming with LSP and GraalVM", Niephaus et al., Onward! 2020: Proceedings of the 2020 ACM SIGPLAN International Symposium on New Ideas, New Paradigms, and Reflections on Programming and Software. (Year: 2020).*

(Continued)

*Primary Examiner* — Schquita D Goodwin
*Assistant Examiner* — Jonathan A Sparks
(74) *Attorney, Agent, or Firm* — Kilpatrick Townsend & Stockton LLP

(57) ABSTRACT

A technique for differentiation controllers and reconcilers for software operators in a distributed computing environment is described herein. In one example of the present disclosure, a system can include a node of a distributed computing environment that includes a container configured to execute a controller associated with a software operator. The controller can determine a reconciler that is associated with the container, detect an event that is associated with the reconciler, and invoke the reconciler via a selected communication protocol. The system can include the reconciler configured to process the event in response to being invoked by the controller and to provide a response associated with the event to the controller via the selected communication protocol.

20 Claims, 6 Drawing Sheets

(56) References Cited

OTHER PUBLICATIONS

Ibryam, B., "Operators and Sidecars Are the New Model for Software Delivery," The New Stack, 2020, https://thenewstack.io/operators-and-sidecars-are-the-new-model-for-software-delivery/.

Busser, A., "Writing a Controller for Pod Labels," Kubernetes, 2021, https://kubernetes.io/blog/2021/06/21/writing-a-controller-for-pod-labels/.

* cited by examiner

DIFFERENTIATING CONTROLLERS AND RECONCILERS FOR SOFTWARE OPERATORS IN A DISTRIBUTED COMPUTING ENVIRONMENT

TECHNICAL FIELD

The present disclosure relates generally to distributed computing environments. More specifically, but not by way of limitation, this disclosure relates to differentiating controllers and reconcilers for software operators in a distributed computing environment.

BACKGROUND

There are various types of distributed computing environments, such as cloud computing systems, computing clusters, and data grids. A distributed computing environment can include multiple nodes (e.g., physical machines or virtual machines) in communication with one another over a network, such as a local area network or the Internet. Cloud computing systems have become increasingly popular. Cloud computing environments have a shared pool of computing resources (e.g., servers, storage, and virtual machines) that are used to provide services to developers on demand.

To help automate the deployment, scaling, and management of software resources such as applications and microservices, some distributed computing environments may include container orchestration platforms. Container orchestration platforms can help manage containers to reduce the workload on users. One example of a container orchestration platform is Kubernetes. Distributed computing environments running Kubernetes can be referred to as Kubernetes environments. Kubernetes environments can include software operators ("operators") for automating various repeatable tasks, such as deployment, scaling, and backup of software resources. In the context of Kubernetes, an operator is a software extension that can manage an assigned software resource, such as a stateful application. Once deployed, operators can create, configure, and manage instances of their assigned software resources on behalf of a user in a declarative way.

DETAILED DESCRIPTION

Figure 1:
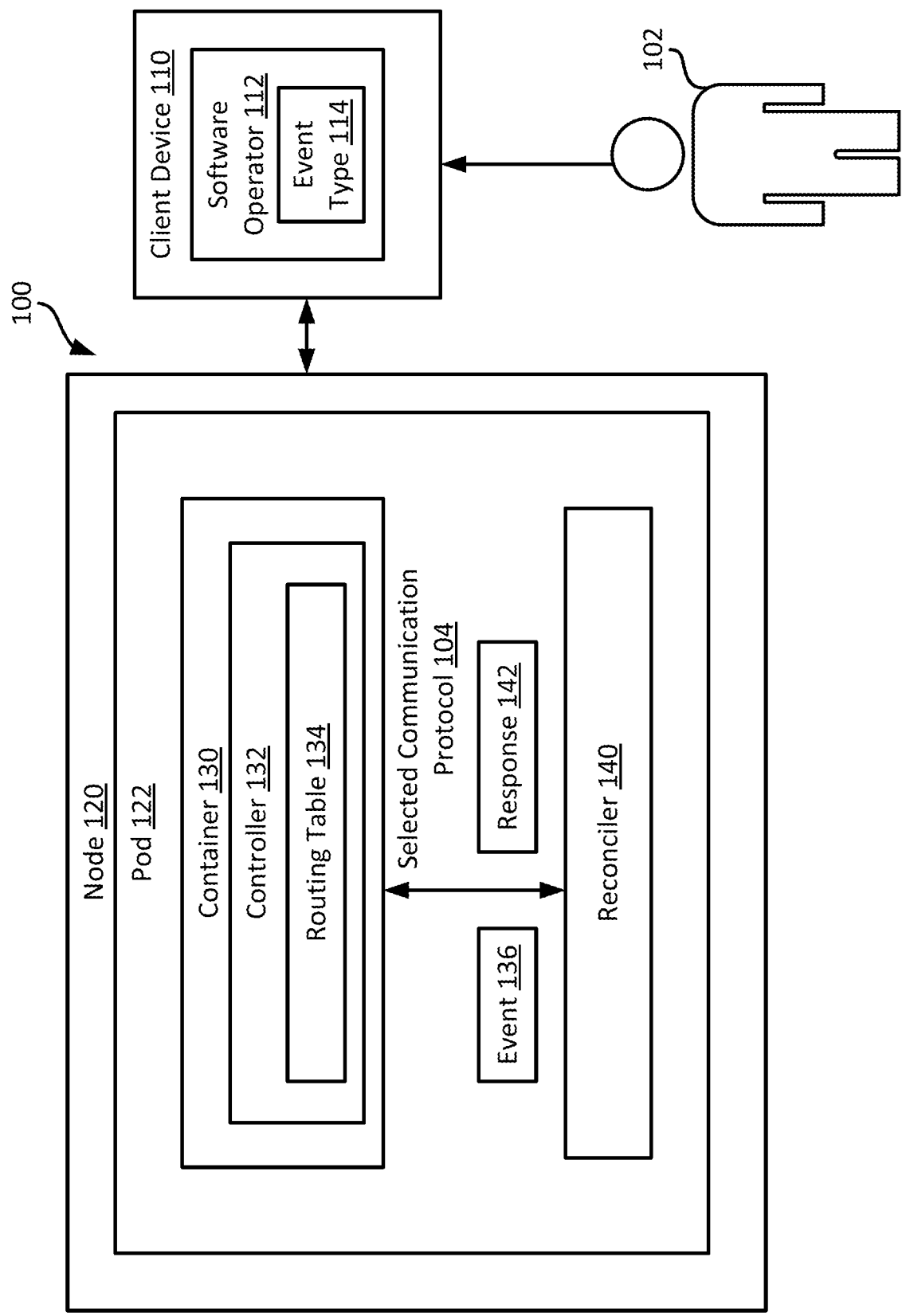
FIG. 1 shows a block diagram of an example of a system for differentiating a controller and a reconciler for a software operator in a distributed computing environment according to some aspects of the present disclosure.

Distributed computing environments, such as cloud computing systems and cluster computing systems, can support software operators for programmatically running and maintaining software applications. Typically, a software operator is associated with a controller that watches a state of the distributed computing environment and a reconciler for managing specific events, or resources, to change the state into a desired state. A user can generate a software operator, and may use an operator framework to assist with the creation of the software operator. A programming language that the reconciler is provided in has to be the same as the programming language that the operator framework is implemented in. But, the user may have limited knowledge about multiple programming languages, so operator frameworks are typically provided in multiple programming languages. As a result, operator frameworks may be complex and expensive to implement. Additionally, the controller and the reconciler may be reused from previous software operators, but since the controller and the reconciler are typically co-located in a pod that is deployed in the distributed computing environment. So, the controller and the reconciler also have to be provided in the same programming language so that the controller and the reconciler can communicate, further increasing the complexity of developing software operators.

Some examples of the present disclosure can overcome one or more of the abovementioned problems by providing a system that includes a node having a container in a distributed computing environment configured to execute a controller associated with a software operator to determine a reconciler of the distributed computing environment that is associated with the container. The controller can detect an event that is associated with the reconciler and then invoke the reconciler via a selected communication protocol, such as a remote procedure call (RPC) protocol, a Google™ remote procedure call (gRPC) protocol, or a JavaScript™ object notation (JSON) message protocol. The system can also include a reconciler for processing the event in response to being invoked by the controller and for providing a response associated with the event to the controller via the selected communication protocol. The selected communication protocol allows the controller to be separate from and to communicate with the reconciler even if the controller and the reconciler are specified in different programming languages. So, a single operator framework is sufficient for assisting with the creation of a software operator, thereby reducing time and resources involved with software development and maintenance.

As one example, a system can receive, by a client device, an indication that a software operator is associated with configmap events. The system can also receive, by the client device, an indication that reconciler A of the software operator handles configmap events. The software operator may be associated with other events and the system can also include other reconcilers for handling the other event types. For example, the system can include a reconciler B for handling memcached events. The system can then deploy, by the client device, a pod on a node of a distributed computing environment that includes reconciler A, reconciler B, and a container that executes a controller that is associated with the software operator. Reconciler A and reconciler B can communicate with the controller via an RPC protocol.

The controller can determine that the controller is associated with reconciler A and reconciler B. The controller can then determine that reconciler A is associated with configmpa events and that reconciler B is associated with memcached events, so the controller can add a watcher for configmap events and memcached events. The controller can then detect a configmap event, determine that the configmap event is associated with reconciler A, and send the configmap event to reconciler A. The controller can receive a response from reconciler A indicating a desired configmap for the distributed computing environment. The controller can adjust attributes of the distributed computing environment so that the configmap matches the desired configmap in the response.

The software operator can be specified by a user. Since the controller is separate from the reconciler A and the reconciler B and uses the RPC protocol to communicate, the reconciler A and the reconciler B can be provided in any programming language. This allows the user to a single operator framework to be used by the user to assist in creating the software operator, regardless of the programming language of the operator framework. Time and resources involved with software development and maintenance can thus be reduced.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for differentiating a controller and a reconciler for a software operator in a distributed computing environment according to some aspects of the present disclosure. The system 100 includes a client device 110 in communication with a node 120 of the distributed computing environment. Examples of the node 120 include a bare metal server, a virtual server, or a proxy server. The distributed computing environment may be a distributed storage system or a cluster computing system. Examples of the client device 110 include a laptop, desktop, mobile device, a server, or other computing device. The client device 110 can access the distributed computing environment via one or more networks, such as a local area network or the Internet.

A user 102 can interact with the client device 110 to define a software operator 112 that represents a set of actions that are to be performed to run and maintain a software application. The user 102 may utilize an operator framework to help with creating the software operator 112 and a controller 132 for the software operator 112. An operator framework can allow the user 102 to reuse some or all of a previously-created controller for a software operator, so the controller 132 may not be in a programming language that the user 102 is familiar with. The controller 132 can be generic logic that is not tied to a particular custom resource definition (CRD) and does not include software application code.

The client device 110 can receive an indication of an event type 114 that is associated with the software operator 112. The event type 114 can correspond to a CRD. For example, the software operator 112 may be associated with event types corresponding to a configmap, memcached operations, software application additions or removals from the distributed computing environment, or any other suitable event type. The client device 110 can also receive a definition of a reconciler loop for enforcing the desired custom resource state on the state of the distributed computing environment from the user 102. Thus, the reconcile loop is associated with one or more particular CRDs. The user 102 can provide the reconcile loop in any programming language, and the programming language can be different than the programming language of the controller 132. The user 102 can select a communication protocol, referred to as selected communication protocol 104, for the controller 132 of the software operator 112 and the reconcile loop. For example, the user 102 can implement an RPC protocol, a gRPC protocol, or a JSON message protocol for the reconcile loop and the controller 132.

The controller 132 and the reconcile loop can then be deployed in the distributed computing environment. The reconcile loop can correspond to reconciler 140. Based on a command from the client device 110, the node 120 can deploy a pod 122 that includes the controller 132 and the reconciler 140 associated with the software operator 112. The pod 122 can be a logical representation of a controller, such as a Kubernetes controller, made up of multiple physical containers. The pod 122 can include a container 130 that executes the controller 132. Although not shown, the reconciler 140 may be included in another container. The container 130 can occupy a first address space of the pod 122 and the reconciler 140 (or a container for the reconciler 140) can occupy a second address space of the pod 122 that is different from the first address space.

Once the pod 122 is deployed, the controller 132 can determine that the reconciler 140 is associated with the controller 132. The controller 132 may receive an indication of one or more reconcilers that are associated with the controller 132. The indication can include the reconciler 140. The controller 132 can then determine event types that are associated with the reconciler 140. The controller 132 can query the reconciler 140 using the selected communication protocol 104 to determine the event type 114 that is associated with the reconciler 140. For example, the controller 132 can query the reconciler 140 to determine that the event type 114 associated with the reconciler 140 is configmap events. The controller 132 can generate a routing table 134 that stores associations of reconcilers and event types. So, the routing table 134 can include an association of the reconciler 140 with the event type 114.

The controller 132 can add a watcher for the event type 114 to the distributed computing environment. For example, the controller 132 can put a watcher for configmap events on an application programming interface (API) service that receives events. If the controller 132 detects an event 136, or resources, associated with the event type 114, the controller 132 can consult the routing table 134 to determine that the event 136 is associated with the reconciler 140 based on the event 136 corresponding the event type 114 and the reconciler 140 handling the event type 114. For example, the event 136 can be a creation or a change of a configmap of the distributed computing environment. The controller 132 can then invoke the reconciler 140 via the selected communication protocol 104. Invoking the reconciler 140 can involve sending the event 136 to the reconciler 140 to be processed by the reconciler 140.

In some examples, the reconciler 140 receives the event 136 from the controller 132 and processes the event 136 to bring a state of the distributed computing environment into a desired state as defined by the event 136. The reconciler 140 can generate a response 142 associated with the event 136 and send the response 142 to the controller 132. For example, for the event 136 that is associated with a configmap event, the reconciler 140 may add an annotation or other information to a configmap of the distributed computing environment indicating a desired state for the configmap. The response 142 can include the desired state for the configmap. In another example, the event 136 may be a memcached event and the reconciler 140 can generate the response 142 as a StatefulSet according to a specification of the event 136.

The controller 132 can receive the response 142 from the reconciler 140 via the selected communication protocol 104. The controller 132 can then adjust one or more attributes of the distributed computing environment based on the response 142. For example, if the response 142 includes the desired state for the configmap, the controller 132 can apply the configmap to the API service in line with the desired state created by the reconciler 140. In addition, if the response 142 includes the StatefulSet, the controller 132 can apply generated resources of the StatefulSet to the distributed computing environment.

Although FIG. 1 depicts a certain number and arrangement of components, other examples may include more components, fewer components, different components, or a different number of the components that is shown in FIG. 1. For instance, the distributed computing environment can include more nodes than are shown in FIG. 1. Additionally, while one client device is shown in FIG. 1, in other examples the system 100 may include more client devices.

Figure 2:
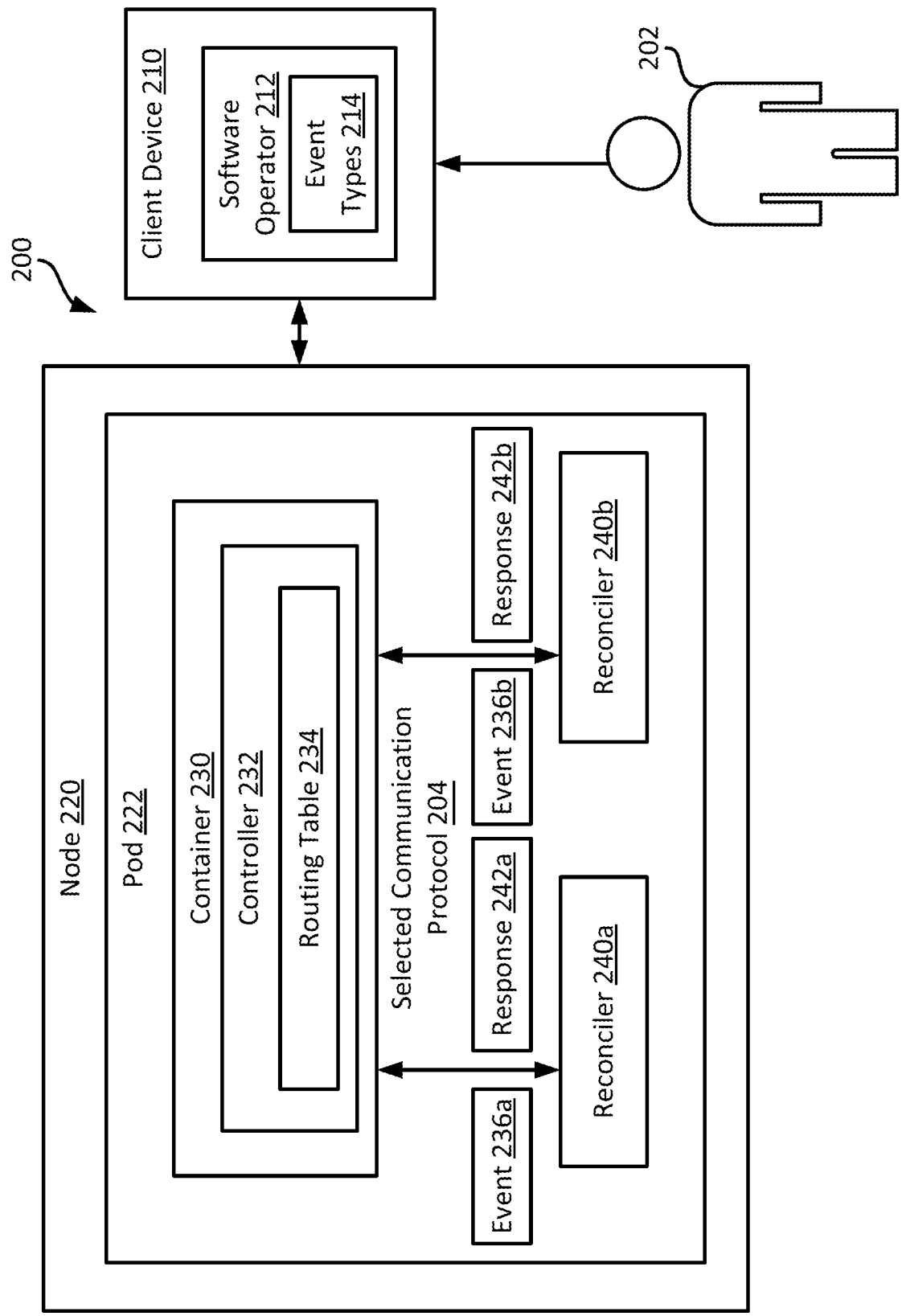
FIG. 2 shows a block diagram of an example of a system for differentiating a controller and multiple reconcilers for software operators in a distributed computing environment according to some aspects of the present disclosure.

FIG. 2 shows a block diagram of an example of a system 200 for differentiating a controller and multiple reconcilers for a software operator in a distributed computing environment according to some aspects of the present disclosure. The system 200 includes a client device 210 in communication with a node 220 of the distributed computing environment. Examples of the node 220 include a bare metal server, a virtual server, or a proxy server. The distributed computing environment may be a distributed storage system or a cluster computing system. Examples of the client device 210 include a laptop, desktop, mobile device, a server, or other computing device. The client device 210 can access the distributed computing environment via one or more networks, such as a local area network or the Internet.

Similar to FIG. 1, a user 202 can interact with the client device 210 to define a software operator 212 that represents a set of actions that are to be performed to run and maintain a software application. The user 202 may utilize an operator framework to help with creating the software operator 212 and a controller 232 for the software operator 212. An operator framework can allow the user 202 to reuse some or all of a previously-created controller for a software operator, so the controller 232 may not be in a programming language that the user 202 is familiar with. The controller 232 can be generic logic that is not tied to a particular custom resource definition (CRD) and does not include software application code.

The client device 210 can receive an indication of event types 214 that are associated with the software operator 212. The event types 214 can correspond to CRDs. For example, the software operator 212 may be associated with event types corresponding to a configmap, memcached operations, software application additions or removals from the distributed computing environment, or any other suitable event type. The client device 210 can also receive a definitions of reconciler loops for enforcing the desired custom resource state on the state of the distributed computing environment from the user 202. Thus, the reconcile loops are associated with one or more particular CRDs. The user 202 may select desired reconcile loops from a library of reconciler loops. The user 202 can provide the reconcile loops in any programming language, and the programming language(s) can be different than the programming language of the controller 232. The user 202 can select a communication protocol, referred to as selected communication protocol 204, for the controller 232 of the software operator 212 and the reconcile loops. For example, the user 202 can implement an RPC protocol, a gRPC protocol, or a JSON message protocol for the reconcile loops and the controller 232.

The controller 232 and the reconcile loops can then be deployed in the distributed computing environment. The reconcile loops can correspond to reconcilers 240a-b. Each of the reconcilers 240a-b may be associated with one or more event types of the event types 214. Based on a command from the client device 210, the node 220 can deploy a pod 222 that includes the controller 232 and the reconcilers 240a-b that are associated with the software operator 212. The pod 222 can be a logical representation of a controller, such as a Kubernetes controller, made up of multiple physical containers. The pod 222 can include a container 230 that executes the controller 232. Although not shown, the reconciler 240a may be included in a second container and the reconciler 140b may be included in a third container. The container 230 can occupy a first address space of the pod 222, the reconciler 240a (or a container for the reconciler 240a) can occupy a second address space of the pod 222 that is different from the first address space, and the reconciler 240b (or a container for the reconciler 240b) can occupy a third address space of the pod 222 that is different from the first address space and the second address space.

Once the pod 222 is deployed, the controller 232 can determine that the reconcilers 240a-b are associated with the controller 232. The controller 232 may receive an indication that the reconcilers 240a-b are associated with the controller 232. The controller 232 can then determine event types that are associated with each of the reconcilers 240a-b. The controller 232 can query each of the reconcilers 240a-b using the selected communication protocol 204 to determine the event types 214 that are associated with the reconcilers 240a-b. For example, the controller 232 can query the reconciler 240 to determine that the event type associated with the reconciler 240a is configmap events. The controller 232 can also query the reconciler 240b to determine that the event type associated with the reconciler 240b is memcached events. The controller 232 can generate a routing table 234 that stores associations of reconcilers and event types. So, the routing table 234 can include an association of the reconciler 240a with configmap events and an association of the reconciler 240b with memcached events.

The controller 232 can add a watcher for each of the event types 214 associated with the reconcilers 240a-b to the distributed computing environment. For example, the controller 232 can put a watcher for configmap events and a watcher for memcached events on an application programming interface (API) service that receives events. If the controller 232 detects an event 136, or a resource, associated with an event type of the event types 214, the controller 232 can consult the routing table 234 to determine that the event is associated with the one or more of the reconcilers 240a-b based on the event corresponding an event type of the event types 214. For example, the controller 232 can receive event 236a and determine that the event 236a is associated with a creation or a change of a configmap of the distributed computing environment. The controller 232 can then invoke the reconciler 240a via the selected communication protocol 204. Invoking the reconciler 240a can involve sending the event 236a to the reconciler 240a to be processed by the reconciler 240a.

In some examples, the reconciler 240a receives the event 236a from the controller 232 and processes the event 236a to bring a state of the distributed computing environment into a desired state as defined by the event 236a. The reconciler 240a can generate a response 242a associated with the event 236a and send the response 242a to the controller 232. For example, for the event 236a that is associated with a configmap event, the reconciler 240a may add an annotation or other information to a configmap of the distributed computing environment indicating a desired state for the configmap. The response 242a can include the desired state for the configmap.

The controller 232 can also receive event 236b and determine that the event 236b is associated with creating a memcached resource, so the controller 232 can invoke the reconciler 240b via the selected communication protocol 204 by sending the event 236b to the reconciler 240b. The reconciler 240b receives the event 236b from the controller 232 and processes the event 236b to bring a state of the distributed computing environment into a desired state as defined by the event 236b. The reconciler 240b can generate a response 242b associated with the event 236b and send the response 242b to the controller 232. For example, for the event 236b that is a memcached event, the reconciler 240b can generate the response 242b as a StatefulSet according to a specification of the event 236b.

The controller 132 can receive the responses 242a-b from the reconcilers 240a-b via the selected communication protocol 204. The controller 232 can then adjust one or more attributes of the distributed computing environment based on the responses 242a-b. For example, if the response 242a includes the desired state for the configmap, the controller 232 can apply the configmap to the API service in line with the desired state created by the reconciler 240. In addition, if the response 242b includes the StatefulSet, the controller 232 can apply generated resources of the StatefulSet to the distributed computing environment.

In some examples, the controller 232 may invoke the reconciler 240b subsequent to invoking the reconciler 240a. For example, the reconciler 240a may handle encryption events, so the controller 232 can invoke the reconciler 240a prior to invoking the reconciler 240b for handling other events. The reconciler 240a may be able to communicate with the reconciler 240b to indicate when the reconciler 240a has finished processing an event so that the reconciler 240b can begin processing events. In this way, the pod 222 can include a pipeline of reconcilers that can each communicate with the controller 232 and each other via the selected communication protocol 204.

Although FIG. 2 depicts a certain number and arrangement of components, other examples may include more components, fewer components, different components, or a different number of the components that is shown in FIG. 2. For instance, the distributed computing environment can include more nodes than are shown in FIG. 2. Additionally, while one client device is shown in FIG. 2, in other examples the system 200 may include more client devices.

Figure 3:
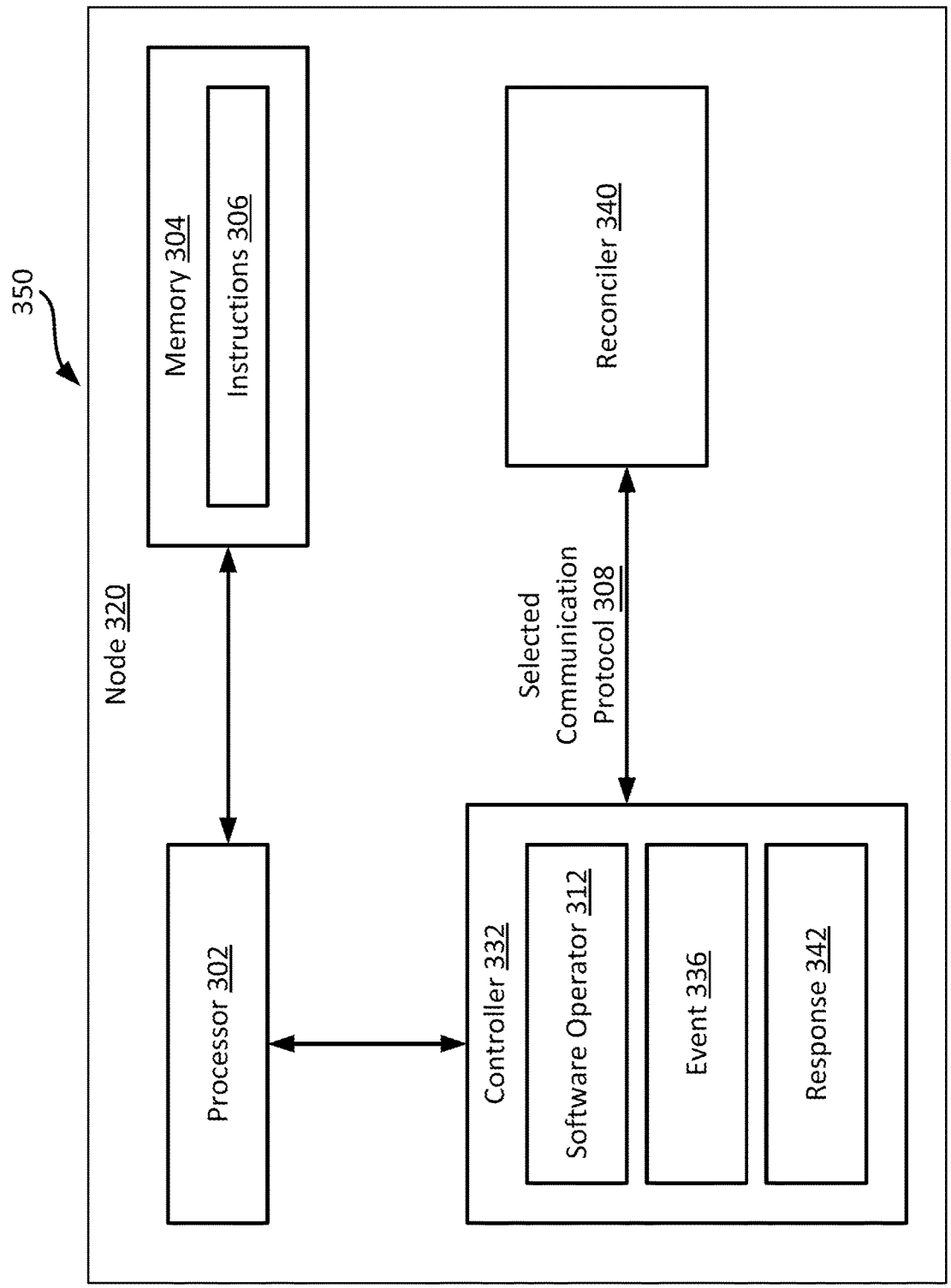
FIG. 3 shows a block diagram of another example of a system for differentiating a controller and a reconciler for a software operator in a distributed computing environment according to some aspects of the present disclosure.

FIG. 3 shows a block diagram of another example of a system for differentiating a controller and a reconciler for a software operator in a distributed computing environment 350 according to some aspects of the present disclosure. The system includes a processor 302 that is communicatively coupled to a memory 304. In some examples, the processor 302 and the memory 304 can be part of the same computing device, such as node 320, which can correspond to node 120 in FIG. 1 or node 220 in FIG. 2. In other examples, the processor 302 and the memory 304 can be distributed from (e.g., remote to) one another.

The processor 302 can include one processor or multiple processors. Non-limiting examples of the processor 302 include a Field-Programmable Gate Array (FPGA), an application-specific integrated circuit (ASIC), or a microprocessor. The processor 302 can execute instructions 306 stored in the memory 304 to perform operations. The instructions 306 may include processor-specific instructions generated by a compiler or an interpreter from code written in any suitable computer-programming language, such as C, C++, C#, Java™, or Python™.

The memory 304 can include one memory or multiple memories. The memory 304 can be volatile or non-volatile. Non-volatile memory includes any type of memory that retains stored information when powered off. Examples of the memory 304 include electrically erasable and programmable read-only memory (EEPROM) or flash memory. At least some of the memory 304 can include a non-transitory computer-readable medium from which the processor 302 can read instructions 306. A non-transitory computer-readable medium can include electronic, optical, magnetic, or other storage devices capable of providing the processor 302 with computer-readable instructions or other program code. Examples of a non-transitory computer-readable medium can include a magnetic disk, a memory chip, ROM, random-access memory (RAM), an ASIC, a configured processor, and optical storage.

The processor 302 can execute the instructions 306 to perform operations. For example, the processor 302 can determine, by a controller 332 of the distributed computing environment 350 associated with a software operator 312, a reconciler 340 of the distributed computing environment 350 that is associated with the controller 332. The processor 302 can detect, by the controller 332, an event 336 that is associated with the reconciler 340. The controller 332 can generate a routing table that stores associations of reconcilers and event types, so the controller 332 can determine that the event 336 is associated with the reconciler 340 based on the routing table. The processor 302 can invoke, by the controller 332, the reconciler 340 via a selected communication protocol 308. For example, the selected communication protocol 308 may be an RPC protocol, a gRPC protocol, a JSON message protocol, etc. The selected communication protocol 308 allows the controller 332 to communicate with the reconciler 340 even if the controller 332 and the reconciler 340 are specified in different programming languages. The processor 302 can receive, by the controller 332 and from the reconciler 340, a response 342 associated with the event 336 via the selected communication protocol 308. The processor 302 may adjust attributes of the distributed computing environment 350 based on the response 342.

Figure 4:
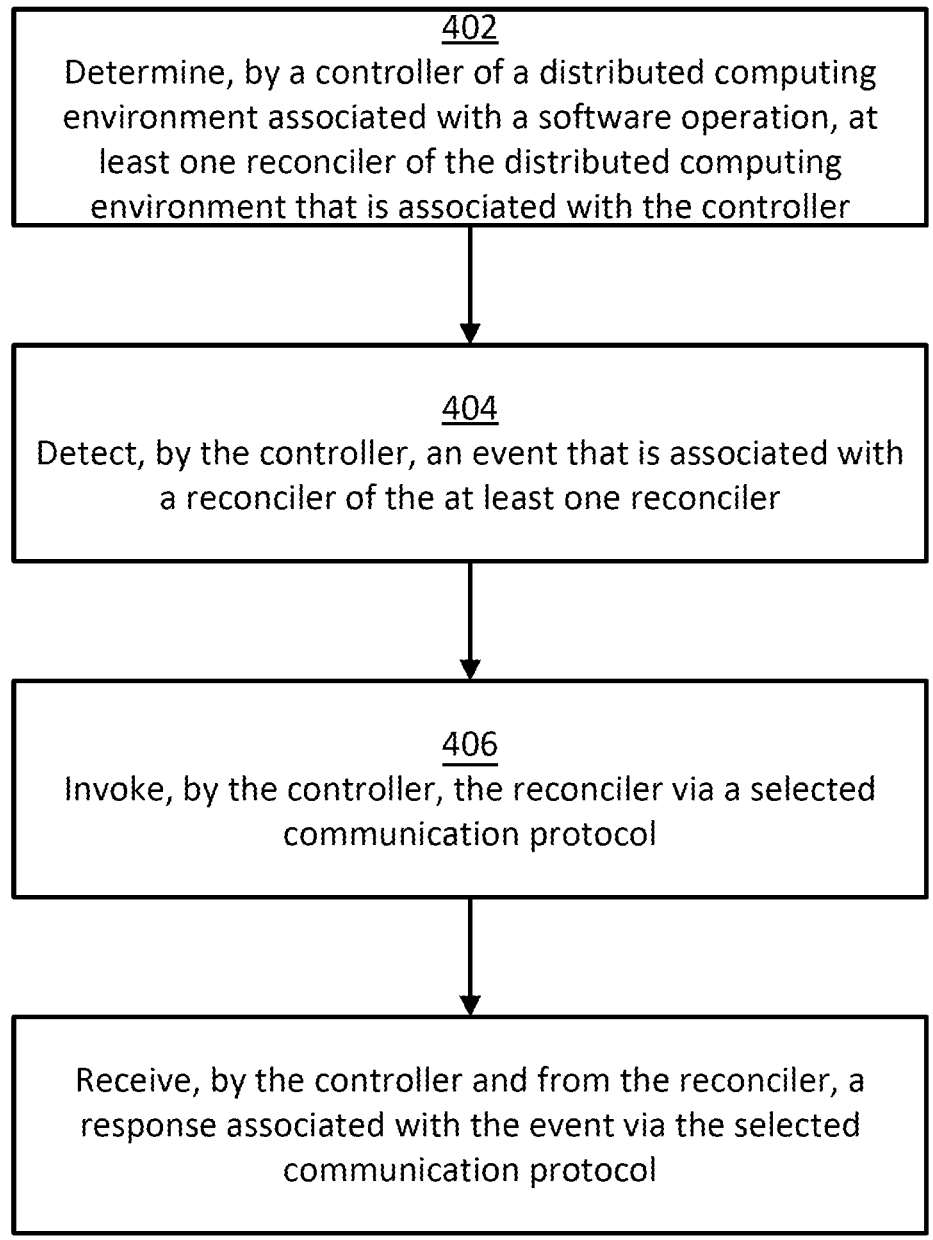
FIG. 4 shows a flow chart of an example of a process for differentiating a controller and a reconciler for a software operator in a distributed computing environment according to some aspects of the present disclosure.

FIG. 4 shows a flow chart of an example of a process for differentiating a controller and a reconciler for a software operator in a distributed computing environment according to some aspects of the present disclosure. Other examples can include more steps, fewer steps, different steps, or a different order of the steps than is shown in FIG. 4. The steps of FIG. 4 are discussed below with reference to the components discussed above in relation to FIG. 3.

In block 402, a processor 302 can determine, by a controller 332 of a distributed computing environment 350 associated with a software operator 312, at least one reconciler of the distributed computing environment 350 that is associated with the controller 332. The controller 332 may receive an indication that the reconciler 340 is associated with the controller 332. The controller 332 may also receive an indication of another reconciler that is also associated with the controller 332 and handles one or more types of events. The controller 332 and the reconciler 340 can be deployed in a pod on a node of the distributed computing environment 350. The controller 332 and the reconciler 340 can occupy separate address spaces of the pod.

In block 404, the processor 302 can detect, by the controller 332, an event 336 that is associated with the reconciler 340 of the at least one reconciler. Prior to detecting the event 336, the processor 302 can query the reconciler 340 to determine an event type that the reconciler 340 handles. For example, the reconciler 340 may handle event types corresponding to a configmap, memcached operations, software application additions or removals from the distributed computing environment, or any other suitable event type. The processor 302 can generate a routing table that associates reconcilers and event types. The routing table can include an association of the reconciler 340 with the event type 314. So, when the processor 302 receives an event and determines it has the event type 314, the processor 302 can consult the routing table and determine that the event type 314 is associated with the reconciler 340.

In block 406, the processor 302 can invoke, by the controller 332, the reconciler 340 via a selected communication protocol 308. For example, the selected communication protocol 308 may be an RPC protocol, a gRPC protocol, a JSON message protocol, etc. The selected communication protocol 308 allows the controller 332 to communicate with the reconciler 340 even if the controller 332 and the reconciler 340 are specified in different programming languages. The processor 302 can send the event 336 to the reconciler 340 to process the event 336.

In block 408, the processor 302 can receive, by the controller 332 and from the reconciler 340, a response 342 associated with the event 336 via the selected communication protocol 308. The controller 332 can use the response 342 to adjust attributes of the distributed computing environment 350. For example, if the event 336 is associated with a creation of a memcached, the reconciler 340 can produce a StatefulSet as the response 342. The StatefulSet can be produced according to a state identified in the event 336. The controller 332 can receive the response 342 of the StatefulSet and apply generated resources to the distributed computing environment 350. As a result of differentiating the controller 332 and the reconciler 340 and using the selected communication protocol 308, a user can use previously-created components in programming languages the user may not be as familiar with. Additionally, an operator framework for assisting in development of software operators can be created once, and not for each programming language.

Figure 5:
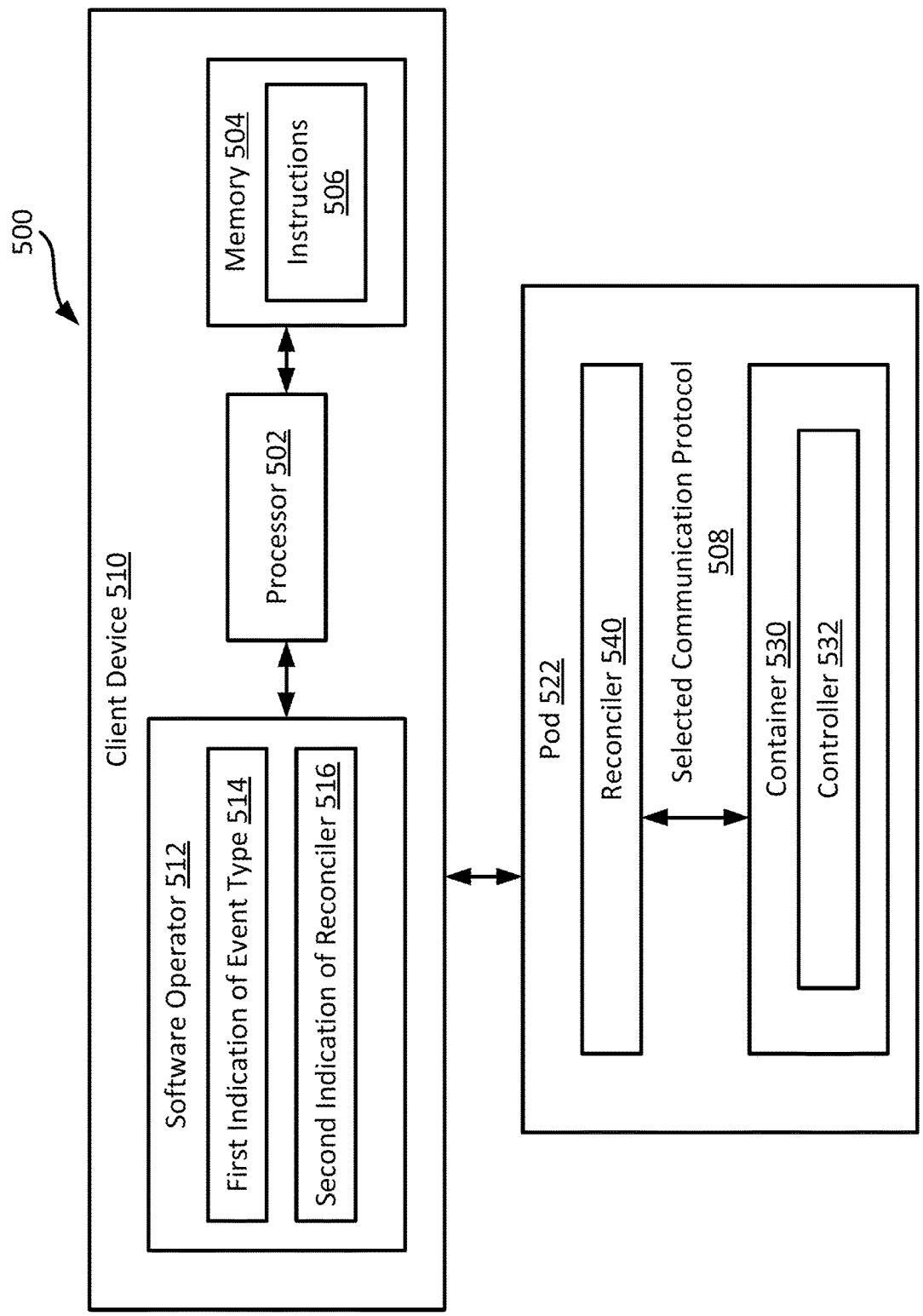
FIG. 5 shows a block diagram of an example of a system for deploying a controller and a reconciler for a software operator received by a client device according to some aspects of the present disclosure.

FIG. 5 shows a block diagram of an example of a system for deploying a controller and a reconciler for a software operator received by a client device according to some aspects of the present disclosure. The system includes a processor 502 that is communicatively coupled to a memory 504. In some examples, the processor 502 and the memory 504 can be part of the same computing device, such as client device 110 in FIG. 1 or client device 210 in FIG. 2. In other examples, the processor 502 and the memory 504 can be distributed from (e.g., remote to) one another.

The processor 502 can execute instructions 506 stored in memory 504 to perform operations. For example, the processor 502 can receive, by a client device 510, a first indication of an event type 514 associated with a software operator 512. The processor 502 can receive, by the client device 510, a second indication of a reconciler 516 that is associated with the event type 514. The processor 502 can deploy, by the client device 510, a pod 522 including the reconciler 540 and a container 530 executing a controller 532 associated with the software operator 512. The reconciler 540 and the container 530 can communicate via a selected communication protocol 508. The selected communication protocol 508 allows the controller 532 to communicate with the reconciler 540 even if the controller 532 and the reconciler 540 are specified in different programming languages. The controller 532 can watch for events associated with the first indication of the event type 513, and upon detecting an event, the controller 532 can invoke the reconciler 540 via the selected communication protocol 508. The reconciler 540 can then process the event and provide a response to the controller 532 for adjusting attributes of a distributed computing environment.

Figure 6:
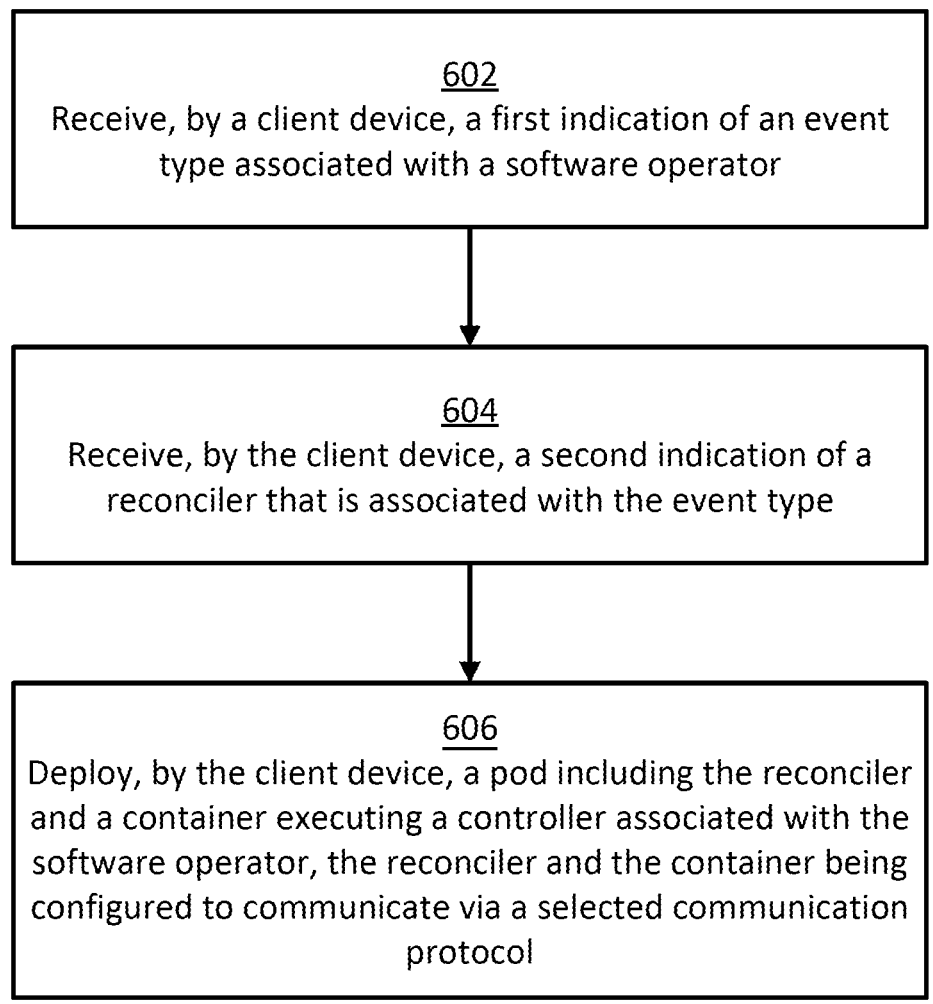
FIG. 6 shows a flow chart of an example of a process for deploying a controller and a reconciler for a software operator received by a client device according to some aspects of the present disclosure.

FIG. 6 shows a flow chart of an example of a process for deploying a controller and a reconciler for a software operator received by a client device according to some aspects of the present disclosure. Other examples can include more steps, fewer steps, different steps, or a different order of the steps than is shown in FIG. 6. The steps of FIG. 6 are discussed below with reference to the components discussed above in relation to FIG. 5.

In block 602, a processor 502 can receive, by a client device 510, a first indication of an event type 514 associated with a software operator 512. The event type 514 may be configmap events, memcached operations, software application additions or removals from the distributed computing environment, or any other suitable event type. A user can specify the event type 514 during creation of the software operator 512. The user can use an operator framework to assist with generating the software operator 512.

In block 604, the processor 502 receive, by the client device 510, a second indication of a reconciler 516 that is associated with the event type 514. The user can specify the reconciler 516, and optionally other reconcilers, that are associated with the software operator 512 and the event types that the reconciler 516 (and the other reconciles). The second indication of the reconciler 516 can indicate that reconciler 540 is associated with the event type 514. Different reconcilers can handle different event types and may be able to be invoked in succession to each other based on the event types each reconciler is associated with.

In block 606, the processor 502 deploy, by the client device 510, a pod 522 including the reconciler 540 and a container 530 executing a controller 532 associated with the software operator 512. The reconciler 540 and the container 530 can communicate via a selected communication protocol 508. Because of the selected communication protocol 508, the user can provide the reconciler 516 in any programming language regardless of a programming language of the controller 532. Thus, an operator framework for assisting creation of software operators need only to be provided in one programming language, and not each desired programming language. The controller 532 can watch for events associated with the first indication of the event type 513, and upon detecting an event, the controller 532 can invoke the reconciler 540 via the selected communication protocol 508. The reconciler 540 can then process the event and provide a response to the controller 532 for adjusting attributes of a distributed computing environment.

As used below, any reference to a series of examples is to be understood as a reference to each of those examples disjunctively (e.g., "Examples 1-4" is to be understood as "Examples 1, 2, 3, or 4").

Example 1 is a system comprising: a node of a distributed computing environment comprising: a container configured to execute a controller associated with a software operator to: determine a reconciler that is associated with the container; detect an event that is associated with the reconciler; and invoke the reconciler via a selected communication protocol; and the reconciler configured to process the event in response to being invoked by the controller and to provide a response associated with the event to the controller via the selected communication protocol.

Example 2 is the system of example 1, wherein the container is configured to detect the event associated with the reconciler by: querying the reconciler to determine an event type that is associated with the reconciler; generating a routing table that associates the reconciler with the event type; in response to receiving the event, determining the event is associated with the event type; and determining, based on the routing table, that the event is associated with the reconciler.

Example 3 is the system of example 2, wherein the reconciler is a first reconciler, the event type is a first event type, the event is a first event, and the response is a first response, the system further comprising a second reconciler, wherein the controller is further configured to: detect a second event of a second event type that is associated with the second reconciler; and invoke the second reconciler via the selected communication protocol; and the second reconciler is configured to process the second event in response to being invoked by the controller and to provide a second response associated with the second event to the controller via the selected communication protocol.

Example 4 is the system of example(s) 1-3, wherein the container is configured to run in a first address space of a pod of the distributed computing environment and the reconciler is configured to run in a second address space of the pod.

Example 5 is the system of example(s) 1-4, wherein the container is further configured to adjust one or more attributes of the distributed computing environment based on the response provided by the reconciler.

Example 6 is the system of example(s) 1-5, wherein the container is in a first programming language and the reconciler is in a second programming language.

Example 7 is the system of example(s) 1-6, wherein the selected communication protocol comprises a remote procedure call (RPC) protocol, a Google™ remote procedure call (gRPC) protocol, or a JavaScript™ object notation (JSON) message protocol.

Example 8 is a method comprising: determining, by a controller of a distributed computing environment associated with a software operator, at least one reconciler of the distributed computing environment that is associated with the controller; detect, by the controller, an event that is associated with a reconciler of the at least one reconciler; invoking, by the controller, the reconciler via a selected communication protocol; and receiving, by the controller and from the reconciler, a response associated with the event via the selected communication protocol.

Example 9 is the method of example 8, wherein detecting the event associated with the reconciler comprises: querying the reconciler to determine an event type that is associated with the reconciler; generating a routing table that associates the reconciler with the event type; in response to receiving the event, determining the event is associated with the event type; and determining, based on the routing table, that the event is associated with the reconciler.

Example 10 is the method of example 9, wherein the reconciler is a first reconciler, the event type is a first event type, the event is a first event, and the response is a first response, the method further comprising: determining a second reconciler of the at least one reconciler that is associated with the controller; detecting a second event of a second event type that is associated with the second reconciler; invoking, by the controller, the second reconciler via the selected communication protocol; and receiving, by the controller and from the second reconciler, a second response associated with the second event via the selected communication protocol.

Example 11 is the method of example(s) 8-10, wherein the controller is configured to run in a first address space of a pod of the distributed computing environment and the reconciler is configured to run in a second address space of the pod.

Example 12 is the method of example(s) 8-11, further comprising: adjusting, by the controller, one or more attributes of the distributed computing environment based on the response provided by the reconciler.

Example 13 is the system of example(s) 8-12, wherein the container is in a first programming language and the reconciler is in a second programming language.

Example 14 is a non-transitory computer-readable medium comprising program code executable by a processor for causing the processor to: determine, by a controller of a distributed computing environment associated with a software operator, a reconciler of the distributed computing environment that is associated with the controller; detect, by the controller, an event that is associated with the reconciler; invoke, by the controller, the reconciler via a selected communication protocol; and receive, by the controller and from the reconciler, a response associated with the event via the selected communication protocol.

Example 15 is the non-transitory computer-readable medium of example 14, wherein the program code is further executable by the processor for causing the processor to detect the event that is associated with the reconciler by: querying the reconciler to determine an event type that is associated with the reconciler; generating a routing table that associates the reconciler with the event type; in response to receiving the event, determining the event is associated with the event type; and determining, based on the routing table, that the event is associated with the reconciler.

Example 16 is the non-transitory computer-readable medium of example 15, wherein the reconciler is a first reconciler, the event type is a first event type, the event is a first event, and the response is a first response, wherein the program code is further executable by the processor for causing the processor to: determine a second reconciler that is associated with the controller; detect a second event of a second event type that is associated with the second reconciler; invoke, by the controller, the second reconciler using the selected communication protocol; and receive, by the controller and from the second reconciler, a second response associated with the second event via the selected communication protocol.

Example 17 is the non-transitory computer-readable medium of example(s) 14-16, wherein the controller is configured to run in a first address space of a pod of the distributed computing environment and the reconciler is configured to run in a second address space of the pod.

Example 18 is the non-transitory computer-readable medium of example(s) 14-17, wherein the program code is further executable by the processor for causing the processor to: adjust, by the controller, one or more attributes of the distributed computing environment based on the response provided by the reconciler.

Example 19 is the non-transitory computer-readable medium of example(s) 14-18, wherein the controller is in a first programming language and the reconciler is in a second programming language.

Example 20 is the non-transitory computer-readable medium of example(s) 14-19, wherein the selected communication protocol comprises a remote procedure call (RPC) protocol, a Google™ remote procedure call (gRPC) protocol, or a JavaScript™ object notation (JSON) message protocol.

Example 21 is a method comprising: receiving, by a client device, a first indication of an event type associated with a software operator; receiving, by the client device, a second indication of a reconciler that is associated with the event type; and deploying, by the client device, a pod including the reconciler and a container executing a controller associated with the software operator, the reconciler and the container being configured to communicate via a selected communication protocol.

Example 22 is the method of example 21, wherein the client device deploys the pod for: detecting, by the controller, an event associated with the reconciler; and invoking, by the controller, the reconciler using a selected communication protocol; and processing, by the reconciler, the event in response to being invoked by the controller to provide a response associated with the event to the controller using the selected communication protocol.

Example 23 is the method of example 22, wherein detecting the event associated with the reconciler comprises: querying, by the controller, the reconciler to determine the event type that is associated with the reconciler; generating, by the controller, a routing table that associates the reconciler with the event type; in response to receiving the event, determining, by the controller, the event is associated with the event type; and determining, by the controller and based on the routing table, that the event is associated with the reconciler.

Example 24 is the method of example(s) 21-23, wherein the container is in a first programming language and the reconciler is in a second programming language.

Example 25 is the method of example(s) 21-24, wherein the selected communication protocol comprises a remote procedure call (RPC) protocol, a Google™ remote procedure call (gRPC) protocol, or a JavaScript™ object notation (JSON) message protocol.

Example 26 is a system comprising: a processor; and a memory including instructions that are executable by the processor for causing the processor to: receive, by a client device, a first indication of an event type associated with a software operator; receiving, by the client device, a second indication of a reconciler that is associated with the event type; and deploying, by the client device, a pod including the reconciler and a container executing a controller associated with the software operator, the reconciler and the container being configured to communicate via a selected communication protocol.

Example 27 is the system of example 26, wherein the memory includes instructions that are executable by the processor for causing the processor to deploy the pod for: detecting, by the controller, an event associated with the reconciler; and invoking, by the controller, the reconciler via the selected communication protocol; and processing, by the reconciler, the event in response to being invoked by the controller to provide a response associated with the event to the controller via the selected communication protocol.

Example 28 is the system of example 27, wherein the memory includes instructions that are executable by the processor for causing the processor to detect the event associated with the reconciler by: querying, by the controller, the reconciler to determine the event type that is associated with the reconciler; generating, by the controller, a routing table that associates the reconciler with the event type; in response to receiving the event, determining, by the controller, the event is associated with the event type; and determining, by the controller and based on the routing table, that the event is associated with the reconciler.

Example 29 is the system of example(s) 26-28, wherein the container is in a first programming language and the reconciler is in a second programming language.

Example 30 is the system of example(s) 26-29, wherein the selected communication protocol comprises a remote procedure call (RPC) protocol, a Google™ remote procedure call (gRPC) protocol, or a JavaScript™ object notation (JSON) message protocol.

Example 31 is a system comprising: means for executing a controller associated with a software operator to perform operations comprising: determining a reconciler that is associated with the controller; detecting an event that is associated with the reconciler; and invoking the reconciler via a selected communication protocol; and means for executing the reconciler to process the event in response to being invoked by the controller and to provide a response associated with the event to the controller via the selected communication protocol.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
   a controller of a container of a distributed computing environment
   a processor in communication with the controller; and
   a memory device including instructions executable by the processor for causing the processor to:
   receive a software operator associated with the controller, the software operator being for programmatically running and maintaining a software application and being created at least in part using a language-agnostic operator framework;
   determine a reconciler that is associated with the container;
   receive an indication of a selected communication protocol for communication between the controller and the reconciler;
   detect an event that is associated with the software application and having an event type of the reconciler;
   invoke, in response to detecting the event, the reconciler via the selected communication protocol; and
   receive, from the reconciler, a response associated with the event via the selected communication protocol.

2. The system of claim 1, wherein the memory device further includes instructions executable by the processor to cause the processor to detect the event by:

querying the reconciler to determine the event type that is associated with the reconciler;
generating a routing table that associates the reconciler with the event type;
in response to receiving the event, determining the event is associated with the event type; and
determining, based on the routing table, that the event is associated with the reconciler.

3. The system of claim 2, wherein the reconciler is a first reconciler, the event type is a first event type, the event is a first event, and the response is a first response, the memory device further including instructions executable by the processor for causing the processor to:
detect a second event of a second event type that is associated with a second reconciler; and
invoke the second reconciler via the selected communication protocol; and
receive a second response associated with the second event via the selected communication protocol.

4. The system of claim 1, wherein a node of the distributed computing environment comprises a pod including the container and the reconciler, and wherein the container is configured to run in a first address space of the pod and the reconciler is configured to run in a second address space of the pod.

5. The system of claim 1, wherein memory device further includes instructions executable by the processor to cause the processor to adjust one or more attributes of the distributed computing environment based on the response received from the reconciler.

6. The system of claim 1, wherein the container is in a first programming language and the reconciler is in a second programming language.

7. The system of claim 1, wherein the selected communication protocol comprises a remote procedure call (RPC) protocol, a Google™ remote procedure call (gRPC) protocol, or a JavaScript™ object notation (JSON) message protocol.

8. A method comprising:
receiving a software operator associated with a controller of a distributed computing environment, the software operator being for programmatically running and maintaining a software application and being created at least in part using a language-agnostic operator framework;
determining at least one reconciler of the distributed computing environment that is associated with the controller;
receiving an indication of a selected communication protocol for communication between the controller and the reconciler;
detect an event that is associated with the software application and having an event type of a reconciler of the at least one reconciler;
invoking, in response to detecting the event, the reconciler via the selected communication protocol; and
receiving, from the reconciler, a response associated with the event via the selected communication protocol.

9. The method of claim 8, wherein detecting the event comprises:
querying the reconciler to determine the event type that is associated with the reconciler;
generating a routing table that associates the reconciler with the event type;
in response to receiving the event, determining the event is associated with the event type; and
determining, based on the routing table, that the event is associated with the reconciler.

10. The method of claim 9, wherein the reconciler is a first reconciler, the event type is a first event type, the event is a first event, and the response is a first response, the method further comprising:
determining a second reconciler of the at least one reconciler that is associated with the controller;
detecting a second event of a second event type that is associated with the second reconciler;
invoking the second reconciler via the selected communication protocol; and
receiving, the second reconciler, a second response associated with the second event via the selected communication protocol.

11. The method of claim 8, wherein a node of the distributed computing environment comprises a pod including the reconciler and a container configured to execute the controller, and wherein the container is configured to run in a first address space of the pod and the reconciler is configured to run in a second address space of the pod.

12. The method of claim 8, further comprising:
adjusting one or more attributes of the distributed computing environment based on the response provided by the reconciler.

13. The method of claim 8, wherein a container configured to execute the controller is in a first programming language and the reconciler is in a second programming language.

14. A non-transitory computer-readable medium comprising program code executable by a processor for causing the processor to:
receive a software operator associated with a controller of a distributed computing environment, the software operator associated with programmatically running and maintaining a software application and being created at least in part using a language-agnostic operator framework;
determine a reconciler of the distributed computing environment that is associated with the controller;
receive an indication of a selected communication protocol for communication between the controller and the reconciler;
detect an event that is associated with the software application and having an event type of the reconciler;
invoke, in response to detecting the event, the reconciler via the selected communication protocol; and
receive, from the reconciler, a response associated with the event via the selected communication protocol.

15. The non-transitory computer-readable medium of claim 14, wherein the program code is further executable by the processor for causing the processor to detect the event by:
querying the reconciler to determine the event type that is associated with the reconciler;
generating a routing table that associates the reconciler with the event type;
in response to receiving the event, determining the event is associated with the event type; and
determining, based on the routing table, that the event is associated with the reconciler.

16. The non-transitory computer-readable medium of claim 15, wherein the reconciler is a first reconciler, the event type is a first event type, the event is a first event, and the response is a first response, wherein the program code is further executable by the processor for causing the processor to:
determine a second reconciler that is associated with the controller;

detect a second event of a second event type that is associated with the second reconciler;

invoke the second reconciler using the selected communication protocol; and receive, from the second reconciler, a second response associated with the second event via the selected communication protocol.

17. The non-transitory computer-readable medium of claim 14, wherein a node of the distributed computing environment comprises a pod including the reconciler and a container configured to execute the controller, and wherein the container is configured to run in a first address space of the pod and the reconciler is configured to run in a second address space of the pod.

18. The non-transitory computer-readable medium of claim 14, wherein the program code is further executable by the processor for causing the processor to:

adjust one or more attributes of the distributed computing environment based on the response provided by the reconciler.

19. The non-transitory computer-readable medium of claim 14, wherein the controller is in a first programming language and the reconciler is in a second programming language.

20. The non-transitory computer-readable medium of claim 14, wherein the selected communication protocol comprises a remote procedure call (RPC) protocol, a Google™ remote procedure call (gRPC) protocol, or a JavaScript™ object notation (JSON) message protocol.

* * * * *